May 13, 1930.                A. KELLNER                1,758,746
                            VEHICLE HEADLIGHT
                    Filed April 18, 1927        3 Sheets-Sheet 1
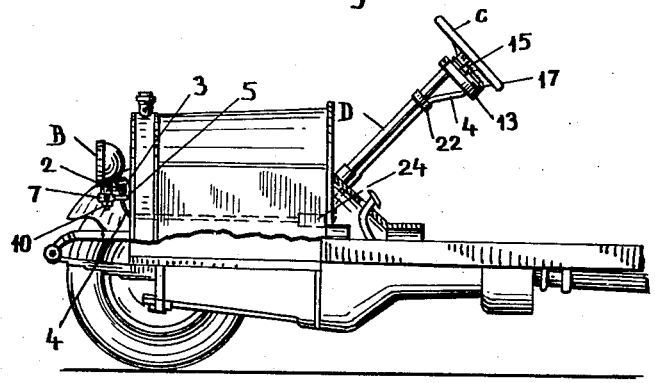
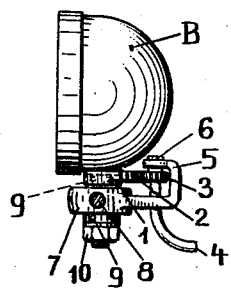
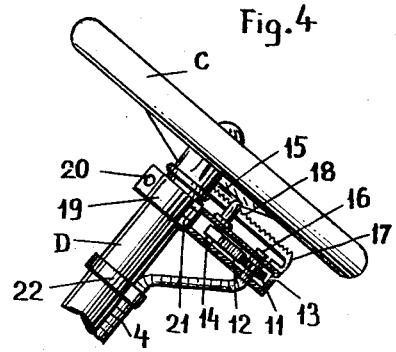
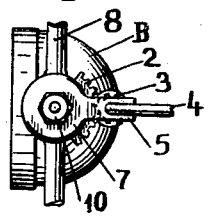
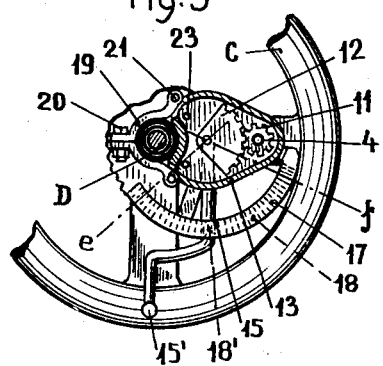
Inventor
Anton Kellner
by Howard A. Coombs, Atty.

May 13, 1930.  A. KELLNER  1,758,746
VEHICLE HEADLIGHT
Filed April 18, 1927   3 Sheets-Sheet 3
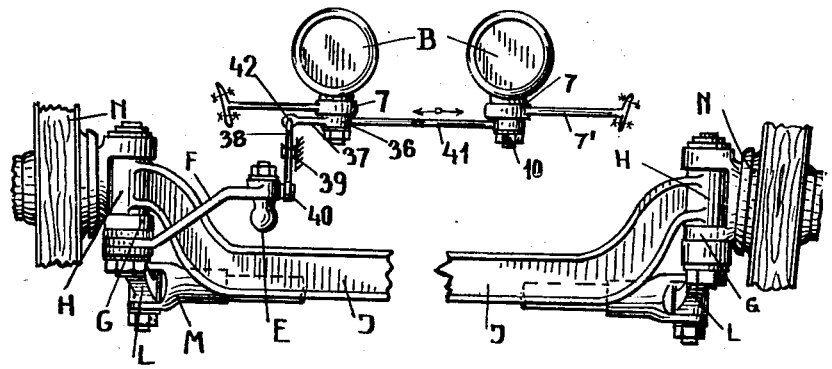
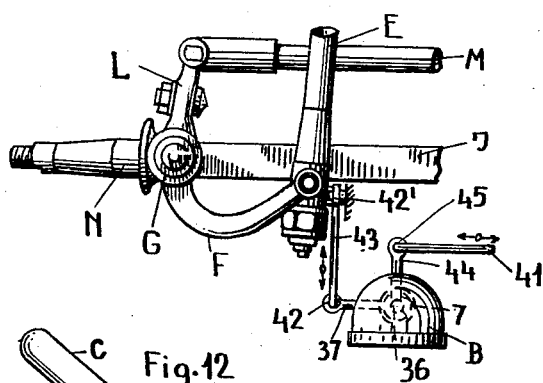
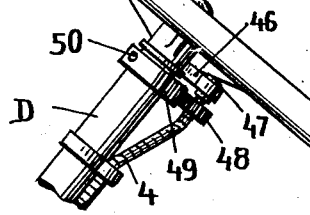
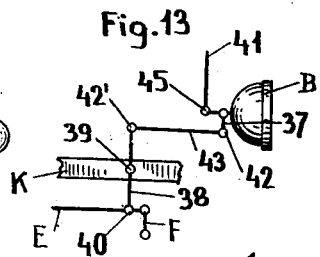

Patented May 13, 1930

1,758,746

UNITED STATES PATENT OFFICE

ANTON KELLNER, OF KARLSBAD, CZECHOSLOVAKIA

VEHICLE HEADLIGHT

Application filed April 18, 1927, Serial No. 184,513, and in Czechoslovakia February 26, 1927.

This invention relates to devices for controlling the head-lights of an automobile vehicle in accordance with the direction of motion of the vehicle and has for its object to provide improved mechanism for this purpose.

When travelling in a vehicle at night the head lights on the vehicle project the light in a certain fixed direction with respect to the vehicle and when turning corners the road or track is not illuminated on the inner side of the curve. Attempts have been made to overcome this disadvantage by providing a special head or spot-light near the driver of the vehicle, this light or lamp being adapted to be manipulated manually by the driver. The disadvantage of such special head or spot-lights is that the driver has to remove one hand from the steering wheel for a considerable time and his attention is divided inasmuch as on the one hand he must continually observe the road ahead and on the other hand has to watch his hand on the head or spot-light. In a closed car or vehicle further complications arise as the driver has to open a window and his movements are somewhat restricted, thus obviously considerably preventing the safe steering of the car.

The object of the present invention is to obviate these disadvantages by enabling the driver to effect the rotation of the head-light or lamp in a substantially horizontal plane, from the driver's seat without being compelled to remove his hand from the steering wheel, by means of a ratchet wheel and flexible or other transmission member the rotation of the lamps being if so desired arranged to be effected by the steering gear of the vehicle or car itself.

In order that the nature of the invention may be clearly understood it will now be described with reference to the accompanying diagrammatic drawings in which:—

Figure 1 is a diagrammatic side view of the front part of an automobile vehicle provided with one constructional form of device for rotating the head-light or lights.

Figure 2 is a view on a larger scale of a head-light and associated rotating mechanism, Figure 3 being a bottom view of the head-light illustrated in Figure 2, Figure 4 a view on a larger scale of the steering wheel and associated mechanism for rotating the head-lights, and Figure 5 a bottom view, partly in section, of the steering wheel illustrated in Figure 4.

Figure 10 is a front view of a constructional form of the invention in which the rotary movement is communicated to the head-lights from the steering control mechanism through lever transmission gear, Figure 11 being a top view of the construction illustrated in Figure 10.

Figure 12 is a view on a larger scale of the steering wheel, rotary movement being communicated to the head-lights upon movement of the steering wheel, Figure 13 being a diagrammatic view of the lever mechanism illustrated in Figures 10 and 11 showing the lever mechanism of a head-light rotated through 90° into the plane of the drawing.

Figure 6:
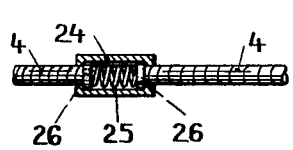
Figures 6 and 7 are views of a buffing device for the control member.

Referring now to Figures 1–5, C is the steering wheel of an automobile vehicle, D the steering column, A the chassis or frame of the vehicle and B a head-light adapted to be rotated in a substantially horizontal plane.

The head-light B is mounted by means of the member 1 in an eye-piece 7 of the carrier rod 8 of the head-light which is adapted to be rotated on the pivot 9 passing through the eye-piece 7. The head-light is prevented from falling out by a nut 10 and washer or the like and ball bearings may be arranged between the nut 10 and a connecting member 2 for the purpose of reducing friction. The eye-piece 7 is provided with a bracket 5 in which a toothed wheel 3 is so located as to be immovable in an axial direction, the bolt on which the toothed wheel 3 is pivotally mounted being secured by a nut 6 to the bracket 5. The toothed wheel 3 is adapted to engage with the member 2 which is in the form of a toothed sector and is connected with a flexible control member 4 extending along the bonnet of the engine through the dash board, up the steering column D to which it is secured by a support 22, and to the toothed wheel transmission mechanism on the steering wheel.

A casing 13 is secured to the upper end of the steering column D by means of a support 19 the parts of which can be rotated about the hinges 21 and are adapted to be secured together by a bolt 20. A toothed sector 12 is rotatably mounted, inside the casing 13, on a pivot 14, the extent of movement or play of the toothed sector 12 being determined by stops 23. A toothed wheel 11 adapted to engage with the toothed sector 12 is rotatably mounted on the pivot 16 on which it is prevented from moving axially, and is also operatively connected with the flexible control member 4. A lever 15, having a handle portion 15′ is mounted on the pivot 14 in such a manner that by moving the lever 15 about the pivot 14 the toothed sector 12 is also rotated. In order to enable the lever 15 to be secured in any required position it is held resiliently in a known manner against teeth 18 in a toothed sector 17, which is secured in a suitable manner to the casing 13 or the steering column D. As illustrated in Figure 5 the lever 15 is bent, the handle portion 15′ being at the side of the steering wheel so as to render it readily accessible without obstructing the steering of the vehicle. The casing 13 may alternatively be arranged to one side, so that the lever may be straight in form. In place of the flexible control element 4 extending to directly below the steering wheel, a shaft may be provided centrally within the steering column D as is the case when levers are provided on the steering wheel for manually controlling the carburettor associated with the engine or the ignition of the engine, in which case the rotary movement is transmitted to the portion of the flexible member extending along the bonnet by a rigid shaft in a protecting casing 24 (Figure 1). Moreover the flexible control member may be replaced entirely by a rigid shaft transmission mechanism.

If therefore the driver of the vehicle desires to rotate a front head-light, he moves the lever 15 with his right or left hand according as to whether the lever is attached on the right or left side of the steering wheel, and the movement of the lever is transmitted to the toothed segment 12 and thence through the toothed wheel 11, flexible control member 4, toothed wheel 3, and toothed sector 2 to the head-light B, the mode of operation being obvious from the drawing. The lever 15 is illustrated in Figure 5 in its middle position in which the axis of the head-light is parallel to the longitudinal axis of the vehicle.

Figure 8:
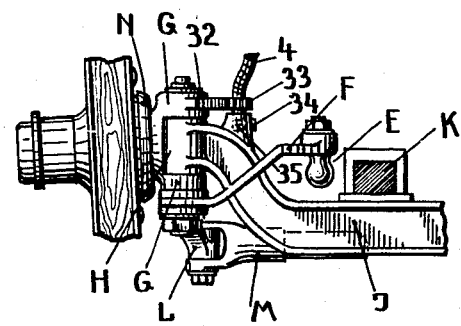
Figure 8 is a view of the front axle of a vehicle the rotary movement of the head-lights being dependent upon the rotary movement of a front wheel, Figure 9 being a front top view of the mechanism illustrated in Figure 8.
Figure 9:
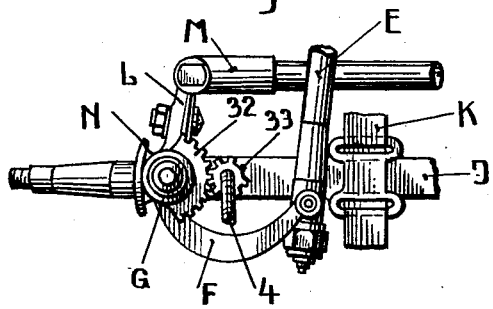

In Figures 8 and 9 a constructional form of the invention is illustrated in which the rotation of a head-light is arranged to be effected by the steering movement of the front wheels of the vehicle. Referring to these figures E is the steering thrust rod, F a lever connected to the front stub axle bracket G, H the stub axle pivot, J the front axle, K the front axle springs, L the connecting rod element, M the connecting rod, and N the hub for securing the wheel to the stub axle.

On the front wheel stub axle bracket a toothed sector 32, adapted to engage with a toothed wheel 33, is secured, the toothed wheel 33 being pivotally mounted on a bracket 34 on the front axle J and operatively connected with the flexible control member 4. Upon effecting a steering movement of the front wheels this movement is transmitted through the toothed segment 32, toothed wheel 33 and member 4 to the head-light B illustrated in Figures 2 and 3 and the head-light is turned to the left or the right and projects the light in the direction in which the car is travelling.

The rotation of the head-light can alternatively be effected from the steering wheel (Figure 12) and for this purpose a toothed sector 50 having teeth 49 adapted to engage with a toothed wheel 48, is mounted on the steering column D, the toothed wheel 48 being secured to the steering wheel C by means of a pivot 47 and bracket 46 and to the flexible control member 4.

Upon rotation of the steering wheel C the toothed wheel 48 rotates in contact with the toothed sector 50 and the flexible control member 4 transmits the motion of the toothed wheel 48 to the rotating mechanism of the lamp B. In order to ensure that shocks, such as always occur when driving and which might be transferred to the head-light through the transmission system do not cause continuous oscillation of the head-light or lights to the left or to the right, a suitable buffing device is inserted in the transmission system which is adapted to absorb momentary shocks.

Figure 7:
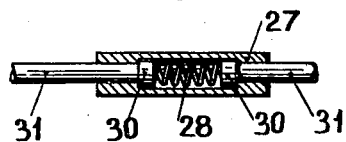

Devices of this character are illustrated by way of example in Figures 6 and 7 for flexible and rigid control members 4 and 31 respectively. The control members are divided into two parts and their adjacent ends connected to members 26 or 30, which are connected to torque transmitting springs 25 or 28 arranged in protective casings 24 or 27 respectively. It will be evident that if the front wheel associated with the toothed segment 32, abuts against an obstruction on the road or track along which the vehicle is travelling it will spring back and then return to its normal position, after the obstruction has been passed, this causing the segment 32 to be rotated and were it not for spring 25 or 28 compensating for the substantially instantaneous torque the head-light would also be rotated, thus causing an unsteady beam of light.

The head-light instead of being rotated through toothed wheel gearing and a flexible or other member may alternatively be controlled through lever mechanism, such lever mechanism being illustrated diagrammatically in Figures 10, 11 and 13.

Referring now to Figures 10, 11 and 13 a two-armed lever 38, pivoted at 40 to the thrust rod E, is adapted to be rotated on a pivot 37 on the chassis or frame of the vehicle. The upper end of the two-armed lever 38 is pivotally connected at 42′ with a thrust 43, the other end of which is hinged at 42 to a lever 37, secured to the member 7″ of the lamp B, which can rotate on pivot 10 in the eye-piece 36 of the head-light carrying device. If it is desired also to rotate a second head-light the rotary movement of the first head-light is arranged to be transmitted to the second head-light by means of the lever 45 and rod 41.

If the steering thrust rod E is moved forward, that is to say if the front wheel moves to the right, then by means of the two-armed lever 38 the head-light B is also rotated to the right and vice versa (Figure 13).

It should be observed that the driver need not remove his hand from the steering wheel and moreover in a closed vehicle or car he need not open a window in order to operate the head-lights.

It will be evident that the invention is not limited to the particular construction and arrangement of parts hereinabove described which may be varied as required in order to suit particular requirements.

Having now described my invention what I claim as new and desire to secure by Letters Patent, is:—

In a motor vehicle, the combination of a head light mounted for rotation in a horizontal plane, a casing mounted on the steering column of the vehicle, a toothed sector pivotally mounted in said casing, a handle carried by said sector and extending out of said casing to a position adjacent the rim of the steering wheel so as to be operable by a hand on said wheel independently of the movement of the latter, a pinion in said casing in mesh with said sector, a toothed rack secured to said casing and cooperating with said handle to hold the same in adjusted position, and rotary flexible means connecting said pinion to the head light.

In witness whereof I have hereunto set my hand.

ANTON KELLNER.